United States Patent
Robinson et al.

(10) Patent No.: US 6,570,867 B1
(45) Date of Patent: May 27, 2003

(54) ROUTES AND PATHS MANAGEMENT

(75) Inventors: Mark C. Robinson, Ottawa (CA); Larry A. Franko, Stittsville (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/288,565

(22) Filed: Apr. 9, 1999

(51) Int. Cl.[7] ............... H04L 12/26; H04J 1/16; G08C 15/00; G06F 11/00; G01R 31/08
(52) U.S. Cl. ............ 370/351; 370/229; 370/238; 370/401; 709/224; 709/238
(58) Field of Search ............. 370/238, 240, 370/248, 229, 230, 235, 241, 233, 401; 709/203, 224, 230, 240, 241, 238, 223; 707/103, 201, 207; 379/133, 137, 197, 220, 221

(56) References Cited

U.S. PATENT DOCUMENTS

| | | | | |
|---|---|---|---|---|
| 5,276,440 A | * | 1/1994 | Jolissaint et al. | 340/825 |
| 5,331,635 A | * | 7/1994 | Ota | 370/401 |
| 5,483,468 A | * | 1/1996 | Chen et al. | 702/186 |
| 5,751,964 A | | 5/1998 | Ordanic et al. | 395/200.54 |
| 5,881,051 A | | 3/1999 | Arrowood et al. | 370/248 |
| 5,987,521 A | * | 11/1999 | Arrowood et al. | 709/239 |
| 6,084,955 A | * | 7/2000 | Key et al. | 379/220 |
| 6,101,500 A | * | 8/2000 | Lau | 707/103 |
| 6,128,016 A | * | 10/2000 | Cocho et al. | 345/808 |
| 6,148,337 A | * | 11/2000 | Estberg et al. | 709/224 |
| 6,321,263 B1 | * | 1/2001 | Luzzi et al. | 709/224 |
| 6,205,498 B1 | * | 3/2001 | Habusha et al. | 710/29 |
| 6,295,540 B1 | * | 9/2001 | Sanschagrin et al. | 707/201 |
| 6,381,635 B1 | * | 4/2002 | Hoyer et al. | 709/207 |
| 6,385,172 B1 | * | 5/2002 | Kataria et al. | 370/238 |

FOREIGN PATENT DOCUMENTS

EP 0849912 4/1997 ........... H04L/12/24

OTHER PUBLICATIONS

Young–Il Kim et al: "A Hybrid Performance Management Scheme for OAM Function Supportings QoS Management in ATM Networks", IEEE, 1999, pp. 251–255.

Nishida T et al., "Architectutal Model for SONET End–to–End Management with Object–oriented Approach", IEEE, 1989, pp. 1500–1505.

* cited by examiner

*Primary Examiner*—Huy D. Vu
*Assistant Examiner*—M. Phan

(57) ABSTRACT

The invention provides a new cost-effective and efficient framework for network management of telecommunications networks by monitoring the network-level concepts of routes and paths. The invention is embodied in a route and path management (RPM) system which includes a data collector for collecting data from the individual network elements, a management server for processing the routing data collected into manageable route and path objects and a graphical unit interface (GUI) for allowing a user to manage and monitor routes and paths in the IP network. By monitoring routes and paths, the RPM provides network managers with the added capability of troubleshooting, performance monitoring, service level planning and provisioning packet forwarding paths between any source-destination endpoints in a network.

12 Claims, 10 Drawing Sheets

ROUTES AND PATHS MANAGEMENT

FIELD OF THE INVENTION

The invention relates to network management and in particular, to methods and apparatus for the management of routes and paths in telecommunications networks.

BACKGROUND OF THE INVENTION

In today's large telecommunications networks such as core networks used for Internet service providers (IMPS) or major corporate backbones, network management plays an important role in maintaining network stability, performance and efficiency. Network management is used to perform a variety of functions including the detection and correction of fault conditions, the identification, configuration and monitoring of use of network devices for cost allocation and performance evaluation.

Presently, the vast majority of networks are manager at the physical or device level by a centralized management entity commonly referred to as a network manager server (hereinafter "network manager") whereby devices in the network such as routers and physical layer interfaces are each individually polled by the network manager for status updates. However, in many situations, this process is not time-efficient.

For example, in the event of a congestion point causing unusual traffic delays or a failures causing a traffic interruption along a particular routing path, each network device located along that particular path and involved in the transmission of the traffic delayed or interrupted as a result of the congestion point or failure must be polled by the network manager to locate the source of the problem. Polling multiple devices each time a problem arises along a particular routing path is therefore time-consuming and as a result, substantially lengthens the time necessary to solve the problem.

Because polling of multiple network devices is time-consuming, most problems encountered in a network may deteriorate or improve by the time a network manager is able to track down the root of the problem, making it more difficult to ascertain its true nature. Moreover, in many cases, clients only report network problems long after their occurrence which, by that time, may not be visible problems anymore. This is particularly true of congestion points which are intermittent by their very nature and only occur in heavy traffic conditions.

In ascertaining the nature of a particular problem, it is often necessary for the network manager to determine which clients are affected and the manner in which these clients are affected. This typically requires a network-level analysis of each problem by considering the performance history of the particular routes and paths used by each client. A route is a static concept typically defined by a source endpoint and a destination endpoint in a network. By contract, a path is a dynamic concept associated with a particular route. A path is defined as the set of network devices and their respective interfaces traversed by traffic travelling in a particular direction at any given point in time on the particular route.

However, current device-level management applications do not provide the necessary tools for efficiently monitoring routes and paths. As a result, these problems become virtually impossible to solve and may persist indefinitely. Therefore, there is a need to provide network operators with the ability to monitor the performance history of routes and paths for efficient troubleshooting of problems arising in a network.

Another drawback of the use of device-level management is that it does not address real-time performance issues at a routing path level which often arise in a network as a result of problems occurring at the device level such as congestion points and link or equipment failures. Device-level management only deals with performance issues for which the network devices are individually responsible. However, this "device-level view" does not provide a path-level understanding of the overall real-time performance of all the devices defining a particular path of a particular route.

For example, in correcting a congestion problem, device-level management does not address whether the data transmitted on a particular source-destination route follows the intended path which may have been specifically provisioned for it or whether it has been rerouted to an alternate path.

When traffic is rerouted due to a failure in the network, another real-time performance issue not addressed by device-level management is whether the alternate path chosen has the requisite capacity for accommodating the traffic delayed or interrupted or whether the traffic as redirected will maintain the same level of service it had prior to being redirected. As network routes are currently sold to network clients with a specific quality of service (QoS), adequate configuration and path provisioning of network routes is becoming increasingly important. Therefore, there is a need for providing a network with adequate real-time performance monitoring and path provisioning capability for maintaining performance in a network and meeting ever increasing QoS demands.

The need to deal with device-level problems in a more time-efficient manner and address real-time performance issues arising as a result of the occurrence of device-level problems has triggered the emergence of what is now known in network management as trace routing. Trace routing applications allow some form of network-level management of paths and routes by relying on test messages to perform path discovery of specified routes. In particular, current trace routing implementations determine the path likely to be followed by traffic for a particular source-destination route by sending one or more test packets from the source node to the destination node and summarizing the results. However, this method has a number of disadvantages. First, the trace routing of any given source-destination route can only be performed from the source node. Another disadvantage is that most network devices are not properly instrumented to do this function and do not treat the test packets with the same priority than normal traffic, Therefore, the results obtained with this method are not truly representative of how the network devices handle their respective traffic in real-time. As a result, there is a need for an improved network management system for managing and monitoring paths and routes in a network and also for monitoring the behaviour of network devices in real-time.

SUMMARY OF THE INVENTION

It is an object of the invention to obviate or mitigate one or more of the above identified disadvantages and shortcomings of current network management applications.

The invention provides a cost-effective and efficient new route and path management (RPM) framework for network management of telecommunications networks by monitoring the network-level concepts of routes and paths. By monitoring paths and routes in a network, the RPM system provides network managers with the added capability of troubleshooting, performance monitoring, service level planning and provisioning paths between any source-destination endpoints (routes) in a network. In a preferred embodiment, the RPM system is incorporated in an Internet protocol (IP) network and is designed to be operable in a simple network management protocol (SNMP) environment. The RPM system is comprised of a data collector for collecting routing data from the individual network devices, a management server for processing the routing data collected into manageable route and path objects for tracing and performance monitoring, a database for storing the results and a graphical unit interface (GUI) for allowing a user to trace routes and paths in the IP network and monitor routing performance.

By comparison with device-level management applications, the present invention advantageously allows the real-time determination of permissible paths having the requisite capability for the transmission of data on a given set of routes and routing protocols.

Yet another advantage of the present invention compared to device-level management techniques is that it provides means for storing and providing, on demand, route history and path-level multi-metric performance history for future provisioning and troubleshooting of the routes and paths monitored.

Similarly to current device-level management applications, the invention allows real-time monitoring and reporting of device-level performance. Yet still another advantage of the present invention over device-level management is that it also provides path-level real-time and historical performance of routes and paths monitored.

Yet still another advantage of the present invention over device-level management techniques is that it provides means for raising or clearing quality of service (QoS) alarms against routes and paths monitored.

In another preferred embodiment, the RPM system as described above also has a management information base (MIB) in which the route and path objects managed by the management server are made available to other network entities and applications via SNMP.

Yet still another advantage of the present invention is that by using an MIB for SNMP storage of the route and path objects managed, the tracing and routing performance results generated by the management server may be remotely accessed by any SNMP entity.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
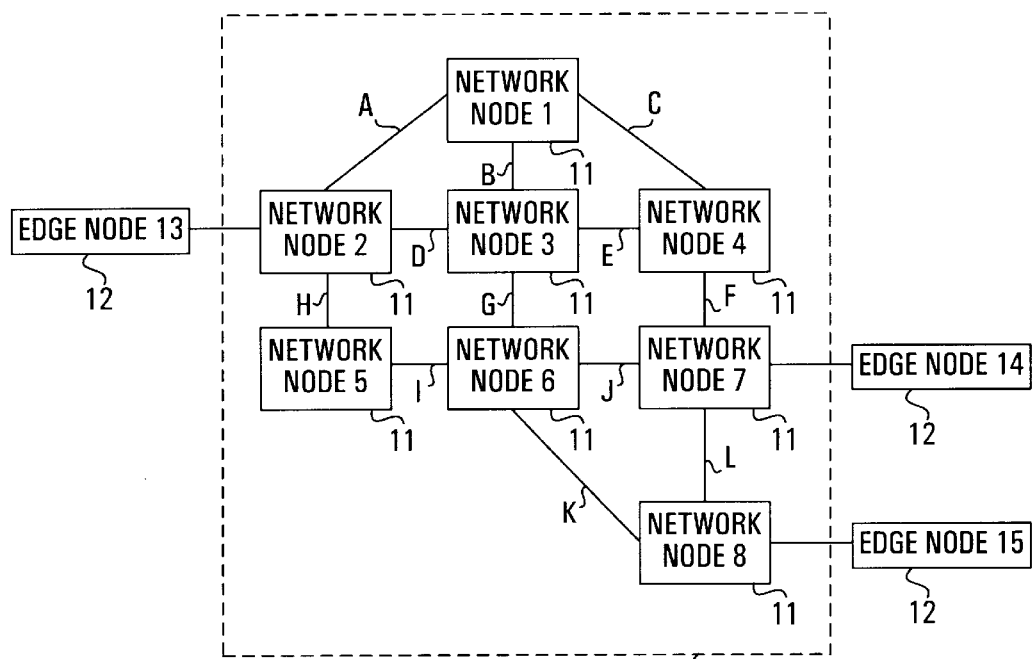
FIG. 1 is a block diagram of an Internet protocol network hereinafter the ("IP network")

This invention provides a cost-efficient and effective framework for network management of telecommunications networks by monitoring the network-level concepts of routes and paths. According to a preferred embodiment, the present invention is embodied as a route and path management (RPM) system designed to be operable in a simple network management protocol (SNMP) environment.

The RPM system can be incorporated in any network topology or configuration. For simplicity however, the invention will now be described only in relation to an Internet protocol network (hereinafter the "IP network"). This IP network is shown in FIG. 1 as 10.

The IP network 10 illustrated therein is composed of a plurality of nodes commonly indicated by 11 and individually numbered 1 through 8. Each of these network nodes 11 is linked to others of the network nodes 11 by one or more communication links respectively labelled A through L (A–L). Each such communication link A–L may be either a permanent connection Dr a selectively enabled (dial-up) connection. Any or all of the network nodes 11 may be connected to one or more edge nodes commonly indicated by 12 for communication with other nodes or networks (not shown) located outside of the IP network 10. For example, in the IP network of FIG. 1, nodes 2, 7 and 8 are connected to a respective edge node 12. These edge nodes are individually numbered 13, 14, 15.

The network nodes 11 each comprises a data processing system (not shown) which provides data communications services to all connected nodes, network nodes 11 and edge nodes 12, as well as providing decision units (not shown) within the node 11. At each network node 11, the decision units present therein serve to selectively route incoming data packets on one or more of the outgoing communication links A–L for transmission to other nodes 11 or edge nodes 12. Such routing decisions are made in response to information in the header of each data packet received.

In the IP network 10, the overall management of the IP network 10 of FIG. 1 is performed by a centralized network management system which can be found in or attached to any one of the network nodes 11 shown in FIG. 1. For clarity, the network management system will now be described below as being part of node 1 in reference to FIGS. 2 through 9 and as such, node 1 is hereinafter referred to as the "network manager". However, it is to be understood that the network management system could alternatively be implemented in any other node 11 of the IP network 10 or in the further alternative, implemented in multiple nodes 11 of the IP network 10.

In the IP network 10 of FIG. 1, the network manager 1 is responsible for executing management applications such as the integrated network management (INM) application for monitoring and controlling network elements or NEs. Network elements are devices such as the edge nodes 12, network nodes 11 and their associated routers and interfaces. In order to be managed by the network manager 1, these network elements are each assigned to a management agent responsible for performing the network management functions requested by the network manager 1.

As is well known, the agents are responsible for accessing information about the network elements assigned to them and make it available to the network manager 1. For example, an agent might report the number of bytes and packets in and out of a particular network element, or the number of messages sent and received by that network element during a given time period. These variables are referred to as managed objects and are maintained in a database referred to as a management information base (MIB) unique to each network element. Therefore, when the network manager 1 requests information relating to a particular element of the IP network 10, that information is obtained from the associated MIB via the agent assigned to the particular network element. In the following description of the IP network 10, the MIBs and associated agents are not always referenced specifically. However, it is to be understood that by referring to the network elements, reference to the associated MIBs and agents is implied.

As noted above, the RPM system 20 of the IP network 10 is implemented to be operable in an SNMP environment. Although not essential to this invention, tile SNMP implementation is highly desirable for promoting interoperability and facilitate the exchanges of management information between the network manager 1 aid the agents of the respective network elements.

Figure 2:
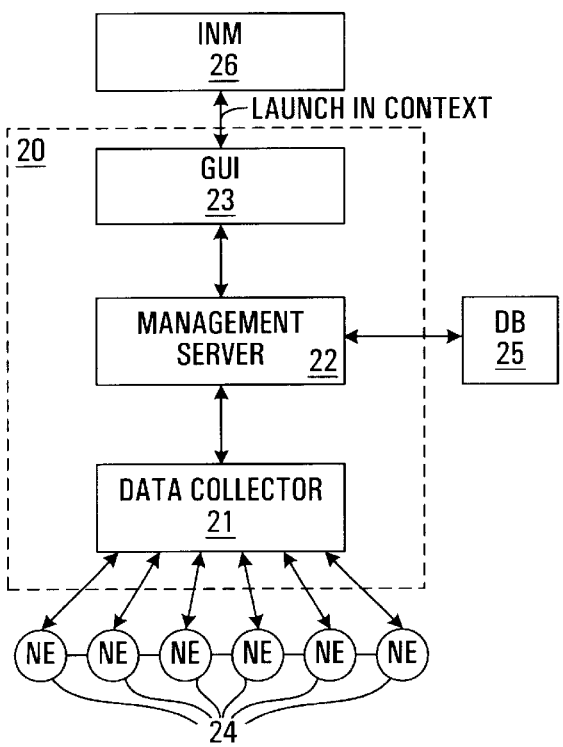
FIG. 2 is a block diagram of a first embodiment of the route and path management (RPM) system of node 1 of the IP network of FIG. 1.

Referring now to FIG. 2, the network manager 1 is provided with the RPM system 20 which provides the functionality required for troubleshooting, performance monitoring, service level planning and provisioning of paths and/or network elements 24 for any source-destination route in the IP network 10. The RPM system 20 is comprised of a management server 22 for providing the RPM functionality described above which is connected to an external database 25. The RPM system 20 also has a standard SNMP data collector (hereinafter simply referred to as "data collector") 21 connected to the management server 22 which is responsible for handling SNMP communications between the management server 22 and the network elements 24 of the IP network 10, and a graphical user interface (GUI) 23 connected to the management server 22 for allowing a user to readily access and make use of the RPM functionality for managing the IP network 10 at a network level.

According to a preferred embodiment, the RPM system 20 is incorporated in the network manager 1 as an add-on to the device-level network management functionality provided by a well-known standard network management application referred to as integrated network management (INM) 26. As such, for the RPM system 20 description provided below, it is to be assumed that the RPM system 20 is designed to be launched from INM 26. It is to be understood that the RPM system could alternatively be designed as an add-on to other network management applications or in the further alternative, as a stand-alone network management application. The specific steps required to implement the RPM system 20 as a stand-alone network management application or the steps to integrate the RPM system 20 into INM 26 or any other network management application would be obvious to a person skilled in the art and, as such, is not described here in any detail.

Figure 3:
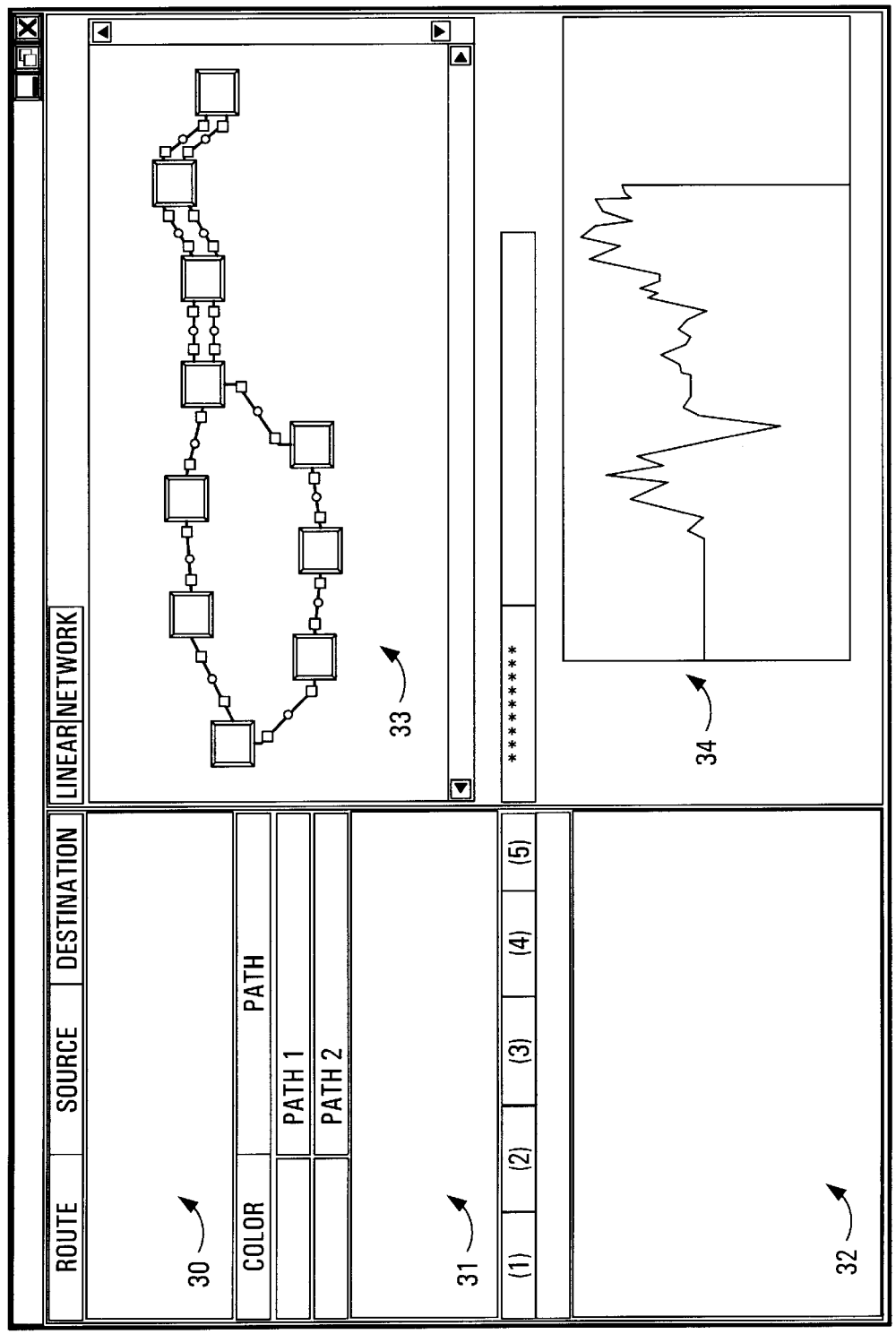
FIG. 3 is a diagram of the graphical user interface of the RPM system of FIG. 2.

Referring now to FIG. 3, there is illustrated the GUI 23 used according to the preferred embodiment of this invention to enable a GUI user to specify and monitor routes, paths and associated network elements. When operational, the GUI 23 produces a main computer window which is subdivided into 5 sections. More specifically, sections 30, 31, 32 of the main is computer window are located on the left hand side of the main computer window to form a left handed pane while sections 4 and 5 are located on the right hand side of the main window forming a right handed pane, Sections 30, 31, 32 of the left handed pane each 20 contains a respective table. In particular, section 30 contains a table which can be used by the GUI user to specify the routes to be monitored (hereinafter the "route table"). In order to specify a particular route, the route table of section 30 contains 3 column fields in which a GUI user can enter the parameters associated with that route. More specifically, the first column field corresponds to the route name, the second column field corresponds to the route source IP and the third column field corresponds to the route destination IP.

Section 31 contains a table (hereinafter the "path table") for displaying the paths associated with a particular route when the route is selected in the route table 30 by the GUI user. The path table 31 contains a path colour column and a path name column for identifying each path of the selected route with a particular colour and name.

Section 32 contains a table (hereinafter the "path instance table") for displaying the paths instances associated with a particular path when the path is selected in the path table 31 by the GUI user. Each path instance provides the parameters of a particular path for a given time. The path instance table 32 contains 5 column fields for the following path attributes: (1) time stamp, (2) path direction, (3) percentage of utilization, (4) errors and discards and (5) latency.

Sections 33 and 34 of the right handed pane each contains a respective notepad for graphically displaying RPM results corresponding to the routes and paths specified in tables 30, 31 and 32.

In particular, section 33 contains a notepad for graphically displaying the nodes, interfaces and links of the routes and paths selected in tables 30, 31 and 32. The notepad of section 33 has 3 display modes, namely a linear graphics mode, a route network graphics mode and a network graphics mode. These modes are selectively enabled by way of a respective pull-down menu located in a top portion of section 33.

In the linear graphics mode, the selected route and its associated paths, nodes and interfaces are shown in the notepad of section 33 on a straight line without regard to the actual layout of the IP network 10. Based on the parameters specified in tables 30, 31, 32, three display scenarios are possible. First, when a route is selected in the route table 30, only the source and destination nodes are shown in the notepad of section 33 secondly, when a path of a particular route specified in the route table 30 is selected in the path table 31, all the nodes and interfaces associated with the path selected are shown on a straight line in addition to the source and destination nodes. Thirdly, when a path instance of a particular path selected in the path table 32 is selected in the path instance table 32, all the nodes and interfaces of the forward path are shown on a top straight line and all the nodes and interfaces of the backward path are shown on a bottom straight line below the forward path.

In the route network graphics mode, the selected route and its associated paths, nodes and interfaces are shown in the notepad of section 33 where the nodes; and interfaces are displayed as positioned in the IP network 10. In other words, the location of the nodes and interfaces as displayed in the notepad of section 33 is representative of their actual location in the IP network 10.

In the network graphics mode, the paths, nodes and interfaces of all the routes specified in the route table 30 are displayed in the notepad of section 33 in the same manner 25 the selected route and its associated paths, nodes and interfaces are shown in the route network graphics mode i.e. the nodes and interfaces are displayed as positioned in the IP network 10.

Section 34 of the right handed pane also contains a notepad for graphically displaying real-time and history performance charts for any one of the routes; specified in the route table 30 or any one of its associated paths, nodes or interfaces.

According to the preferred embodiment of the invention, the GUI 23 is designed to allow the GUI user to specify the rate at which the selected route and paths are to be monitored. The monitoring rate is defined by the rate at which the network elements are polled by the management server 22 (see below) which corresponds to the rate at which the information in the GUI 23 is to be updated. This rate is hereinafter referred to as the polling rate and for the GUI 23 of the present invention, this rate is set to 10 minutes.

In operation, the tables 30, 31, 32 and the section 33 and 34 notepads are empty. In order to specify a particular route, the GUI user enters the parameters associated with that route in the route table 30 and in particular, the route name, the route source IP and the route destination IP. As the GUI user wishes to monitor more routes, these routes can also be specified in the route table 30 by entering their respective route parameters i.e. the route name, the route source IP and the route destination IP.

Once the desired routes have been specified into the route table 30, each particular route contained therein may then be selectively monitored at the rate specified by the monitoring rate (see above). In order to monitor a particular route, the route must first be selected (highlighted) in the route table 30. As this occurs, all the paths associated with that particular route will appear in the path table 31. When a path is selected among the paths contained in the path table 31, all of the instances of the selected path will be displayed in the path instance table 32. As a result, each path instance of the selected path will be displayed showing the parameters of the selected path for specific times. The notepads in sections 33 and 34 can be used thereafter for monitoring the performance and path changes of the path instances listed in the path instance table 32.

Figure 4:
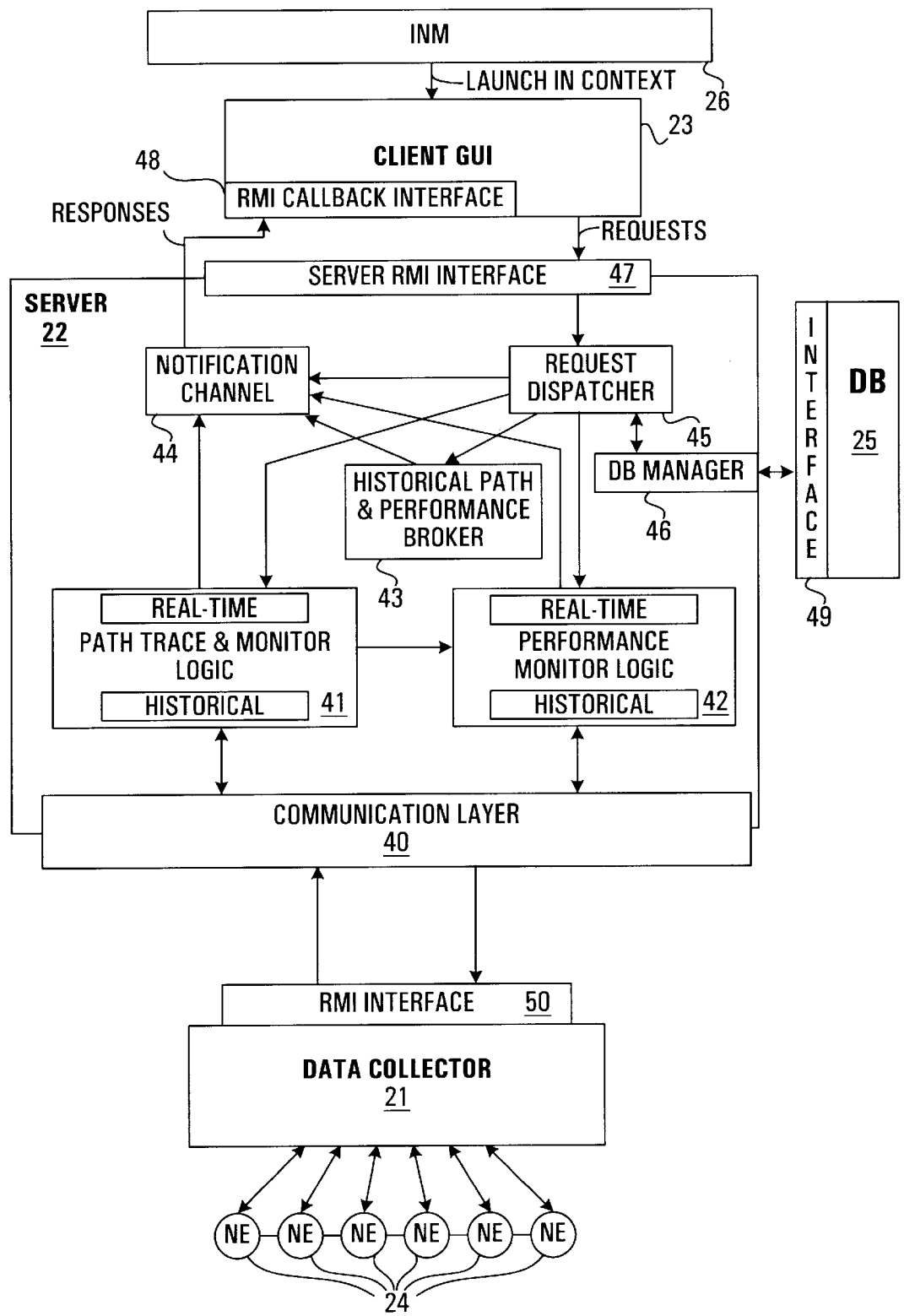
FIG. 4 is a more detailed block diagram of the RPM system of FIG. 2.

Referring now to FIG. 4, there is illustrated a more detailed block diagram of the RPM system 20 of FIG. 2. Briefly stated, the RPM system 20 provides real-time and historical tracing of routes and paths specified by a user through the GUI 23 as well as real-time and historical performance monitoring of the routes and paths specified. The route tracing and performance monitoring functionality is embodied in the management server 22 to provide the network manager 1 with the added capability of troubleshooting, performance monitoring, service level planning and provisioning paths between any source-destination endpoints (routes) in the IP network 10 of FIG. 1.

In order to carryout the above-mentioned functionality, the management server 22 is comprised of a path trace & monitoring logic (T&ML) unit 41 for the real-time and historical tracing of a specified route, a performance monitoring logic (ML) unit 42 for monitoring the performance of the paths associated with a specified route and a historical path & performance broker 43 for analyzing past trace and performance results. The management also has a collector interface (communication layer) 40, a database (DB) manager 46, a request dispatcher 45, a server remote method invocation (RMI) interface 47 and a notification channel 44 all interconnected with the path T&ML unit 41, the path & performance broker 43 and the performance ML unit 42 in the following manner. The collector interface 40 is externally connected to the data collector 21 through an RMI interface 50 and internally connected to both the path T&ML unit 41 and the performance ML unit 42. The path T&ML unit 41 is connected to the performance ML unit 42 and also to the notification channel 44. The notification channel 44 is externally connected to the GUI 23 via the RMI 48 internal to the GUI 23. The performance ML unit 42 is also connected to the notification channel 44 and to the DB manager 46 providing connectivity with the database 25 external to the management server 22 through an interface 49. The management server 22 also has the request dispatcher 45 connected to receive requests from the GUI 23 via the server RMI 47 internal to the management server 22. The request dispatcher 45 is connected to the DB manager 46, the path T&ML unit 41, the historical path & performance broker 43 and the performance ML unit 42.

The following section will now describe in detail and in reference to FIGS. 5 through 10 the operation of the management server 22 in terms of the architecture and functionality of each of its path T&ML unit 41, historical path & performance broker 43 and performance MD unit 42.

Figure 5:
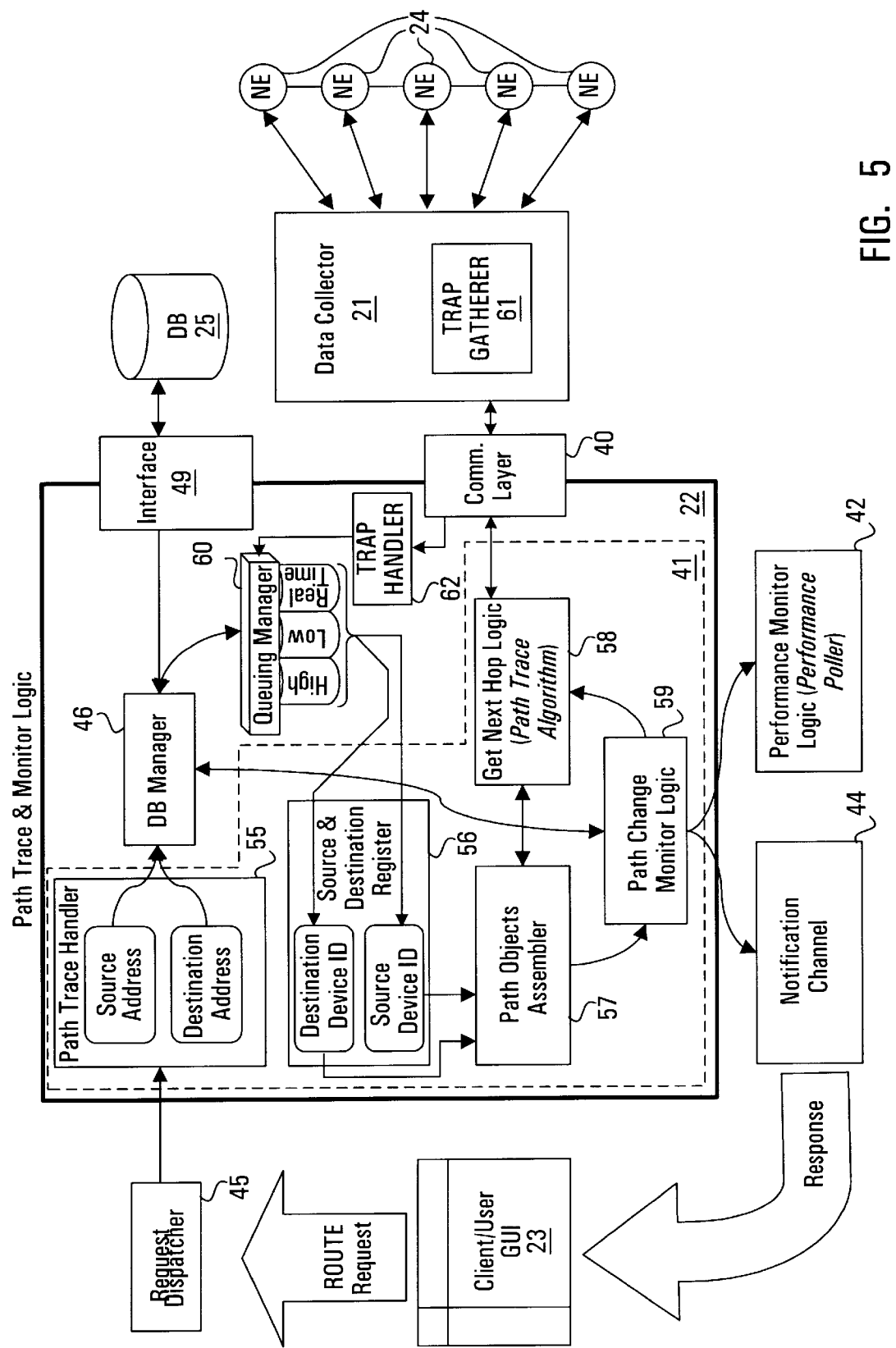
FIG. 5 is a block diagram of the path trace & monitor logic unit as implemented in the RPM system of FIG. 4.

Referring firstly to FIG. 5, tile RPM system 20 shown with a more detailed block diagram of the path T&ML unit 41 as implemented in the management server 22 for providing real-time and historical tracing of a specified route. In particular, the path T&ML unit 41 is comprised of a path trace handler 55, a source and destination register 56, a path objects assembler 57, a "get next hop" logic block 58, a queuing manager 60, and a path change monitor logic 59 all interconnected within the management server 22 as follows. The path trace handler 55 is connected to the request dispatcher 15 and to the DR manager 46. The source and destination register 56 is connected to the queuing manager 60 and to the path objects assembler 57. The path objects assembler 57 is, in turn, connected to the get next hop logic 58 and the path change monitor logic 59. The path change monitor logic 59 is coupled to the DB manager 46, the notification channel 44, the performance ML unit 42 and the get next hop logic 58. The get next hop logic 58 is externally connected to the data collector 21 via the collector interface 40.

The real-time tracing operation of the management server 22 is triggered when the user requests, through the GUI 23, that a particular route be traced in real-time. The request dispatcher 45 receives the user's request and places it into the path trace handler 55. The path trace handler 55 operates to separate the route tracing request into its constituent source and destination endpoint components and subsequently forwards them to the DB manager 46. Upon receipt, the DB manager 46 requests from the database 25 all the associated source and destination objects interfaces for the source and destination endpoint components of the specified route.

Once captured from the database 25, the DB manager 46 places the source and destination objects into the queuing manager 60 which is responsible for queuing and processing route tracing requests according to a high priority, a real-time priority, a historical high priority or a historical low priority. For a real-time trace routing request, the DB manager 46 places the source and destination objects of the route specified by the user into the queuing manager's real-time queue for processing. When the queuing manager samples the real-time queue, it then draws the source and destination objects associated with the specified route and sends them into the source and destination register 56 for further processing.

For each of the source endpoint and intermediate points located between the source endpoint and the destination endpoint, the path objects assembler 57 asks the get next hop logic 58 (further details below) to find the next hop to the destination endpoint until it actually hits the destination endpoint. This results in the discovery (assembly) of all the paths used in real-time by traffic being transmitted on the specified route from the source endpoint to the destination endpoint, each path being defined as a manageable object containing a respective set of network devices) and associated interfaces located between the source endpoint and the destination endpoint of the specified route. These paths are hereinafter referred to as "forward paths". This path discovery process is repeated for assembling the paths used for transmitting traffic from the destination endpoint to the source endpoint (hereinafter referred to as "backward paths").

For each forward and backward path assembled, the path objects assembler 57 places the corresponding constituent network devices and associated interfaces into a respective path list for notification back to the user which can then access this information via the GUI 23 (see above). The path objects assembler 57 also operates to temporarily store the results of the paths discovered into the database 25 through the DB manager 46 in order to save the results of the real-time tracing operation for real-time performance analysis. The path objects assembler 57 then informs the performance ML unit 42 to begin sending real-time performance data back to the user through the GUI 23 (further details below).

As routing in a network is dynamic, the paths discovered for the route specified are monitored periodically by the path change monitor logic 59 for path changes. In particular, the paths are rediscovered and checked against the existing paths at the polling rate specified by the user in the GUI 23. If the rediscovered paths differ from the existing paths in any way (by a single network device or a single interface), this causes the paths to be updated or new paths to be associated with the specified route. If there is any path changes, an alarm is generated by the path change monitor logic 59 for the GUI user through the notification channel 44.

There may be situations where path changes occur between polling events which are worthy of notification to the GUI user. To address these situations, the RPM system 20 is designed with the ability to handle traps generated by network elements 24 and notify the GUI user of significant events.

Traps generated by network elements 24 are received into the management server 22 through a trap gatherer 61 which is preferably implemented in the data collector 21. The trap gatherer 61 forwards each trap received to a trap handler 62 which is internal to the management server 22. Upon receiving a trap from a particular network element 24, the trap handler 62 requests that all paths associated with that particular network element 24 be placed into the high priority queue for processing so that the GUI user can be notified of the changes.

In order to trigger the historical tracing operation of the management server 22, the user has to request, through the GUI 23, that a particular route be monitored so that the results of the tracing operation be saved permanently in the database 25 for subsequent historical analysis. Similarly to the real-time tracing operation of the management server 22, the user's historical route trace request is received in the request dispatcher 45 which places it into the path trace handler 55. The path trace handler 55 operates to separate the historical trace route request into its constituent source and destination endpoint components and subsequently forwards them to the DB manager 46. Similarly to the manner in which a real-time route trace request is processed, the DB manager 46 then requests and captures from the database all the associated source and destination objects (interfaces) for the source and destination endpoint components of the specified route and registers each object pair as a historical monitored route into a route list maintained in the database 25 for all historical monitored routes.

In order to service the user's historical route trace request, the queuing manager 60 periodically requests that the DB manager 46 provides it with a list of all source and destination object pairs stored in the route list of the database 25 and places them in its low priority queue. The queuing manager 60 will then sequentially send, in accordance with its defined priority levels, the low priority object pairs queued to the source and destination register 56 for processing and subsequent forwarding to the path assembler 57. The path objects assembler 57 operates in the same tanner it operates when assembling (discovering) paths in response to a real-time route trace request. Accordingly, in this case, the path objects assembler 57 operates to assemble all of the forward and backward paths associated with the route specified, requests that the path change monitor logic 59 monitor the paths discovered at the polling rate and notify the user via the notification channel 44 of any path changes observed as a result of a new poll or a trap received from the IP network 10.

However, in contrast to real-time operations, the path objects assembler 57 operates to permanently store the results of the paths discovered into the database 25 through the DB manager 46 in order to save the results of the historical tracing operation. By sending an appropriate request to the management server 22, the GUI user can then obtain the historical information stored for subsequent historical performance analysis.

Figure 6:
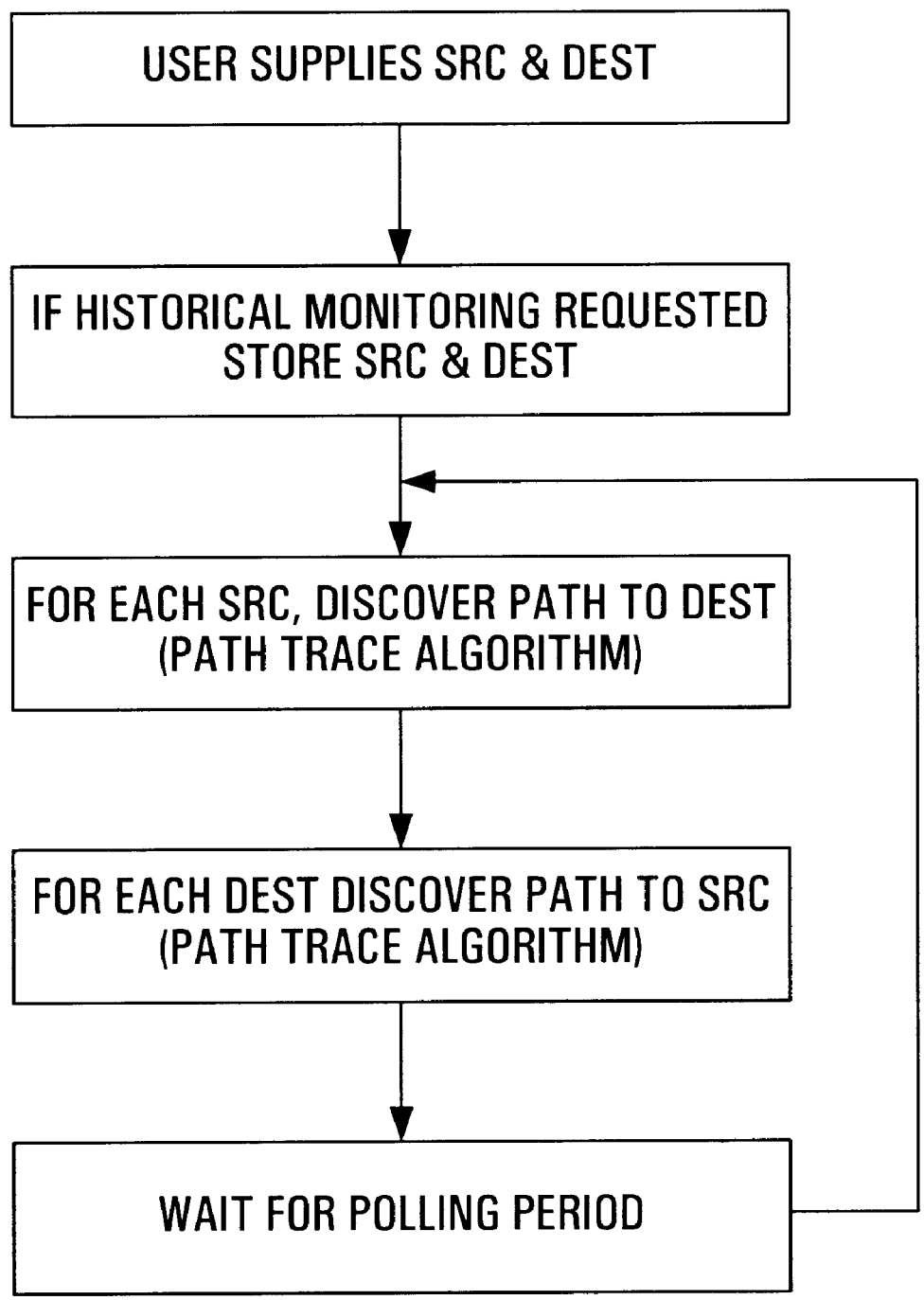
FIG. 6 is a flowchart of the main steps required for discovering the paths of a specified route historically and in real-time.

To further explain the real-time and historical tracing operation of the management server 22, a flowchart is shown in FIG. 6 illustrating the main steps performed by the management server 22 in servicing a real-time or historical route tracing request for discovering the paths of the route specified. From this flowchart, it can be observed that the tracing operation of a particular route is triggered by the user which specifies the source and destination endpoints of the route. It can also be observed that if historical monitoring is performed, the source and destination endpoints of the specified route are permanently saved in the database 25 (FIG. 5) for subsequent historical analysis. It can still be further observed that for each of the source endpoint and intermediate points located between the source endpoint and the destination endpoint which are traversed by traffic travelling from the source endpoint and the destination endpoint, all the associated forward paths are discovered. It can still be further observed that this path discovery process is repeated for the backward paths associated with the particular route specified.

As noted above in reference to FIG. 5, the forward paths and backward paths are assembled by running a path trace algorithm. This particular algorithm is run by the get next hop logic 58 of FIG. 5 which, for the source endpoint or anus of the intermediate points located between the source endpoint and the destination endpoint, operates to find the next intermediate point (hop) to the destination endpoint until it actually hits the destination endpoint. This involves sequencing through each intermediate point located between the source endpoint and the destination endpoint of the specified route and gathering routing and interface information specific to each intermediate point. The information gathered is then processed by the path objects assembler 57 (see FIG. 5) for assembling the paths associated to the specified route.

Figure 7:
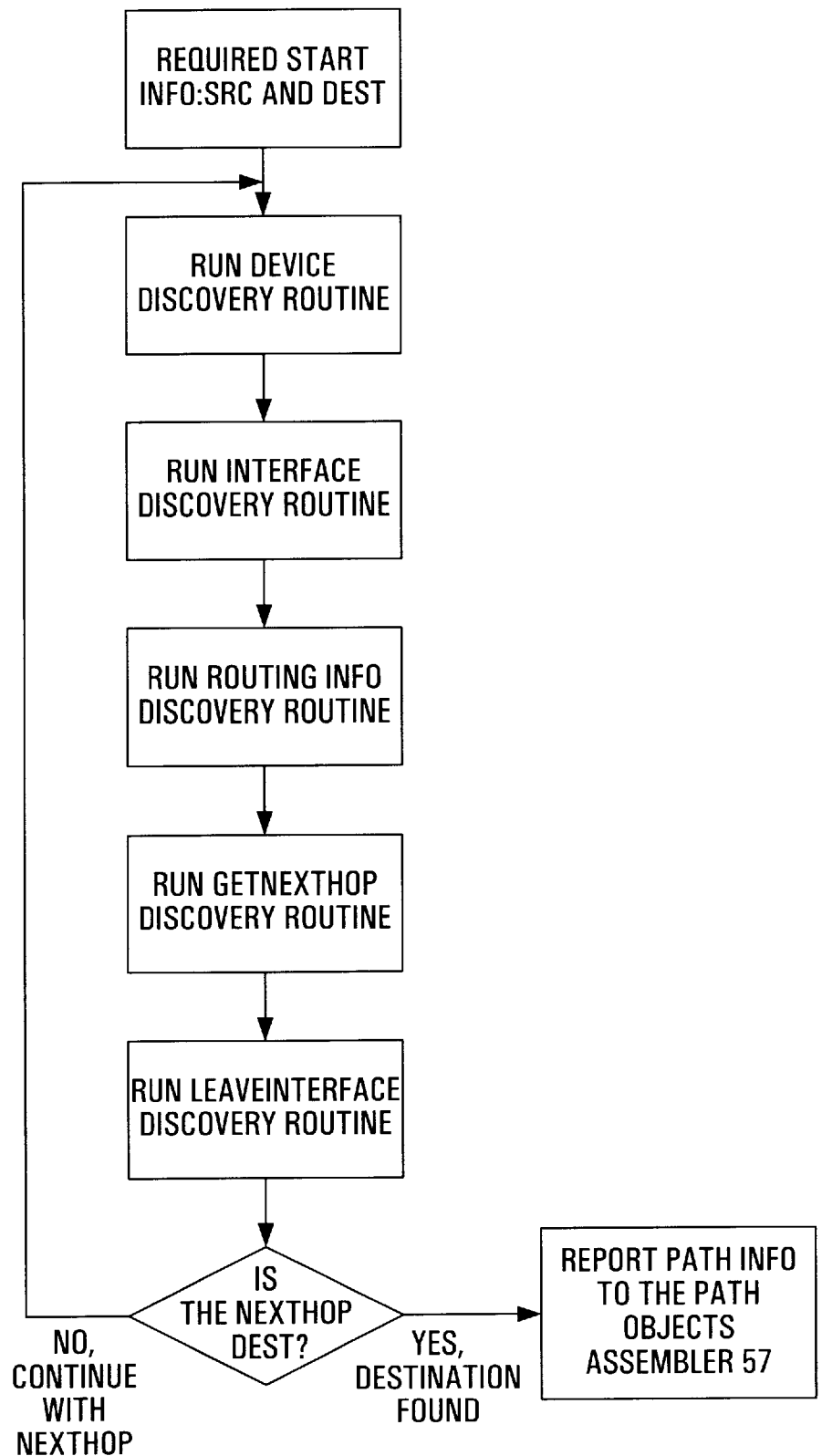
FIG. 7 is a flowchart of the main steps executed by the path trace algorithm used for discovering the paths of a specified route historically and in real-time.

To further describe this, reference is now made to FIG. 7 which contains a flowchart of the sequencing operation of the path trace algorithm referred to above. Prom this flowchart, it can be observed that based on the particular source endpoint specified by the GUI user, the path trace algorithm initially runs a device discovery routine for gathering identification information about that particular source endpoint. Next, an interface discovery routine is run for determining the input interface associated with the particular source point specified. Next, the path trace algorithm runs a routing information discovery routine for obtaining information about the manner in which the source endpoint routes traffic intended for the destination endpoint. Next, the path trace algorithm runs a get next hop discovery routine to find the next hop in the path to the destination endpoint which is followed by a leave interface discovery routine run to determine the particular output interface associated with the source endpoint. Next, the next hop is compared to the destination endpoint supplied by the GUI user and if the next hop is the destination endpoint, a path to the destination endpoint is found and reported to the path objects assembler 57. If the next hop is not the destination endpoint, then the next hop is fed back into the path trace algorithm which runs again for determining the next hop in the path to the destination endpoint. This process is repeated until the next hop becomes the destination endpoint at which time, as noted above, the path found is reported to the path objects assembler 57 (FIG. 5).

Figure 8:
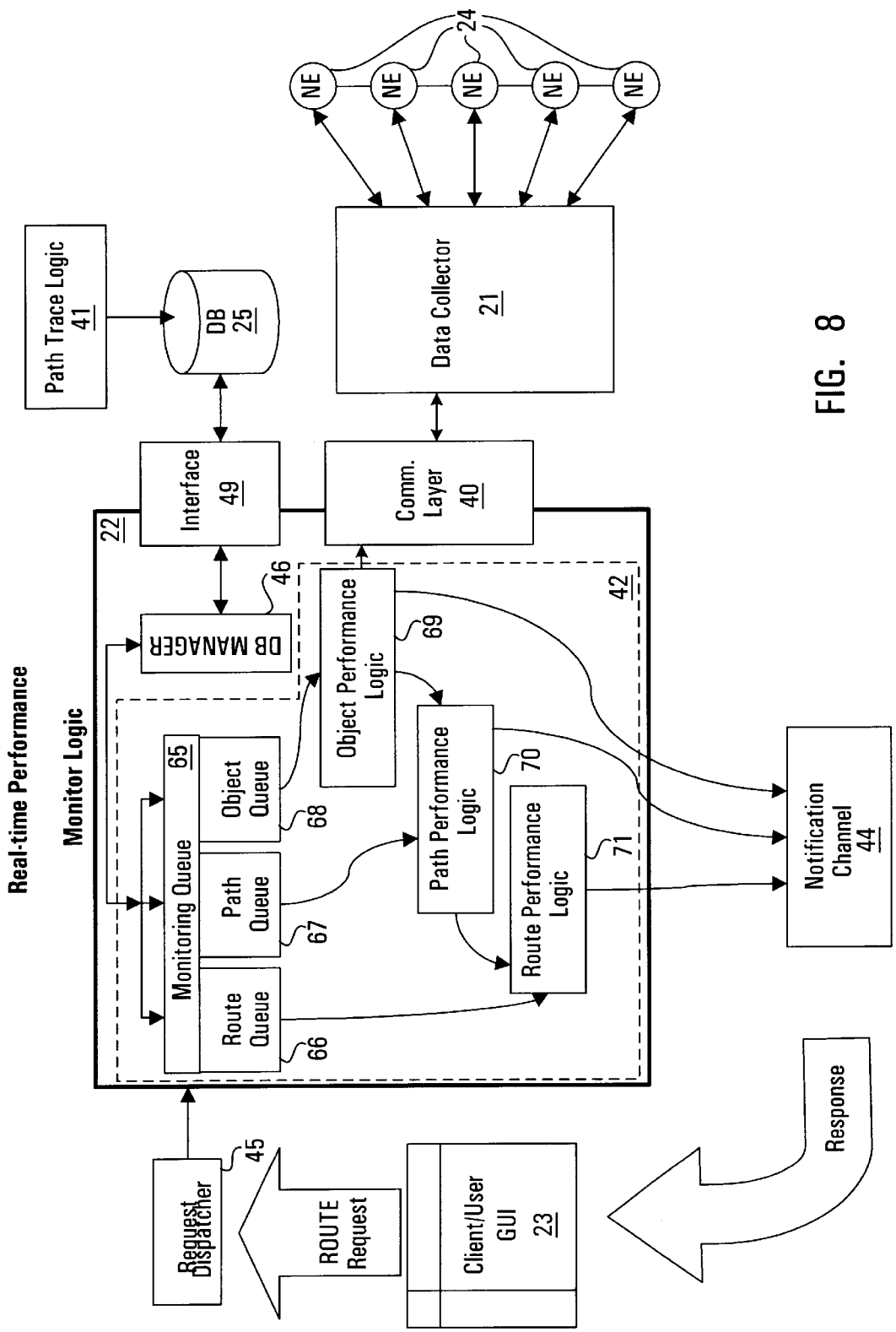
FIG. 8 is a block diagram of the performance monitor logic unit as implemented in the management server of the RPM system of FIG. 4 for providing real-time performance monitoring of a specified route.

Referring now to FIG. 8, there is illustrated a more detailed block diagram of the performance ML unit 42 of FIG. 4 as implemented in the management server 22 for providing real-time performance monitoring of a specified route.

The performance ML unit 42 is comprised of a monitoring queue 65 externally connected to both the request dispatcher 45 and the DB manager 46 and internally connected to a route queue 66, a path queue 67 and an object queue 68. These queues 66, 67, 68 are respectively used for holding identification data related to routes, paths and associated objects (network devices, interfaces, etc.) which is periodically updated from the database 25 each time a real-time performance monitoring request comes in from the request dispatcher 45 (further details below). The route path and object queues 66, 67, 68 are respectively connected to a corresponding route, path and object performance logic unit 70, 71, 69. The object performance logic unit 69 is externally connected to the data collector 21 through the communication layer 40 and also internally connected in series to the path and the route performance logic units 70, 71. Finally, each of the route, path and object performance logic units 71, 70, 69 is externally connected to the notification channel 44.

According to the preferred embodiment of the present; invention, the real-time performance monitoring operation of the management server 22 is triggered as the user requests, through the GUI 23, that the performance of a particular route be monitored in real-time. This usually occurs after the specified route has been traced in real-time when the path objects assembler 57 of the path T&ML unit 41 (see FIG. 5) requests the performance ML unit 42 to begin sending real-time performance data back to the user through the GUI 23.

When such a request is initiated, it is received in the monitoring queue 65 which, as a result, proceeds to update the information contained in each of the route, path and objects queues 66, 67, 68 with new identification data which was previously temporarily stored in the database 25 by the path objects assembler 57 (FIG. 5) in executing the associated request for real-time tracing of the route specified. This new identification data is added to the existing (old) identification data contained the corresponding queue 66, 67, 68. The object performance logic 69 begins polling each network object listed in the object queue 68 (new and old) through the data collector 21 to obtain performance data for each of the objects listed. The object performance logic 69 then forwards the polled responses obtained to the notification channel for notification to the GUI 23.

The polled responses are also sent to the path performance logic 70 together with the polled objects where the objects polled are compared to threshold data contained in the path queue 67 and performance for each of the paths listed therein is calculated. The path performance logic 70 will then notify the route performance logic 71 that it has completed the path performance analysis for the particular objects polled and forward its performance results to the notification channel 44 for transmission to the GUI 23. The path performance logic 70 also proceeds to forward its performance results together with the paths for which performance was calculated to the route performance logic 71 which compares the paths obtained from the path performance logic 70 with the old identification data contained in the route queue 66 and calculates an overall route performance metric which is then transmitted to the GUI 23 through the notification channel 44. The real-time monitoring operation of the management server 22 just described above is repeated at the polling rate specified by the user through the GUI 23.

Figure 9:
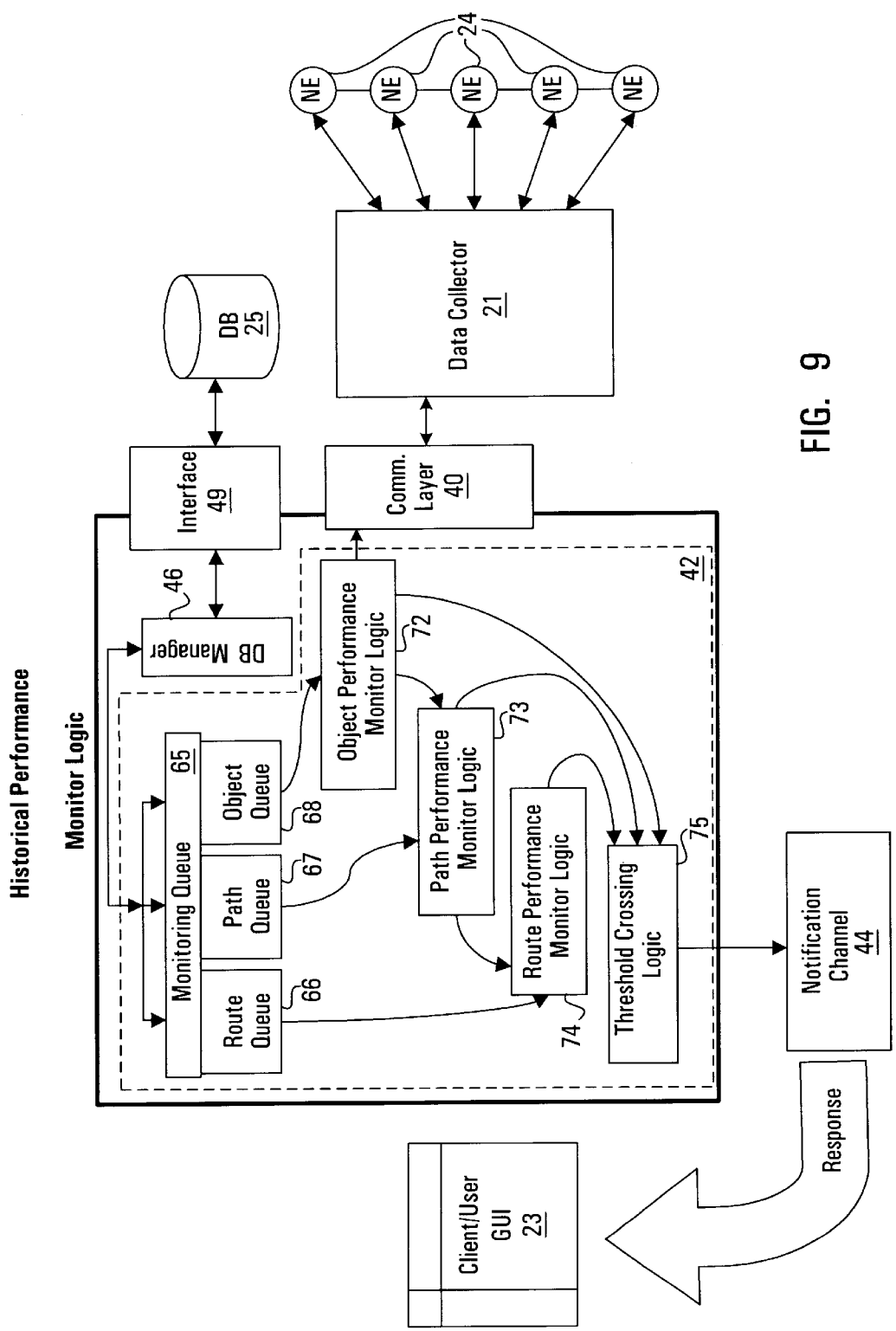
FIG. 9 is a block diagram of the performance monitor logic unit as implemented in the management server of the RPM system of FIG. 4 providing historical performance monitoring of a specified route.

Referring now to FIG. 9, there is illustrated a more detailed block diagram of the performance ML unit 42 of FIG. 4 as implemented in the management server 22 for providing historical performance monitoring of a specified route. The route queue 66, a path queue 67 an object queue 68 described above are also used by the performance ML unit 42 for historically monitoring the performance of a specified route. It will be recalled that the queues 66, 67, 67 are respectively used for holding identification data related to routes, paths and associated objects (network devices, interfaces, etc.). As will be described below, this identification data is periodically updated from the database 25. The route, path and object queues 66, 67, 68 are respectively connected to a corresponding route, path and object performance monitor logic 74, 73, 72. The object performance monitor logic unit 72 is externally connected to the data collector 21 through the communication layer 40 and also internally connected in series to the path and the route performance monitor logics 73, 74. Finally, each of the route, path and object performance monitor logics 74, 73, 72 is externally connected to the notification channel 44.

The historical performance monitoring operation of the management server 22 is initially triggered by a request from the user, through the GUI 23, that the performance of a particular route be historically monitored. Upon being requested to initiate historical performance monitoring of a specified route, the historical performance ML unit 42 polls the associated objects through the data collector 21, computes the performance of each of the objects polled and with these results, computes the performance of each path associated with the specified route and again with these results, computes the performance of the specified route itself. All of these performance results are permanently saved in the database 25 for subsequent historical analysis.

More specifically, when a historical performance monitoring request is initiated, it is received in the monitoring queue 65 which, as a result, proceeds to update the information contained in each of the route, path and objects queues 66, 67, 68 with new identification data which was previously permanently stored in the database 25 by the path objects assembler 57 in executing the associated request for historical tracing of the route specified. This new identification data is added to the existing (old) identification data contained the corresponding queue 66, 67, 68.

The object performance monitor logic 72 begins polling each network object listed in the object queue 68 (new and old) through the data collector 21 to obtain performance data for each of the objects listed. The object performance monitor logic 72 then forwards the polled responses obtained from the data collector 21 to the notification channel for notification to the GUI 23. The polled responses are also sent to the path performance monitor logic 73 together with the polled objects where the objects polled are compared to the old identification data contained in the path queue 67 and performance for each of the active paths listed therein is calculated. The path performance monitor logic 73 will then notify the route performance monitor logic 74 that it has completed the path performance analysis for the particular objects polled and forward its performance results to the notification channel 44 for transmission to the GUI 23.

The path performance monitor logic 773 also proceeds to forward its performance results together wish the paths for which performance was calculated to the route performance monitor logic 74 which compares the paths obtained from the path performance logic 73 with the old identification data contained in the route queue 66 and calculates an overall route performance metric which is then transmitted co the GUI 23 through the notification channel 44.

The performance of the specified route and each of the associated paths and objects is also measured against appropriate performance thresholds located in the threshold crossing logic 75. If any performance threshold is breached for any of the objects, paths or the specified route itself, the user is notified through the notification channel 44. Once the threshold calculations have been completed, the historical performance monitoring process described above is carried out again to obtain new performance values which are also permanently stored in the database and checked against appropriate performance thresholds. The historical performance monitoring process is repeated until terminated by the user via the GUI 23.

Figure 10:
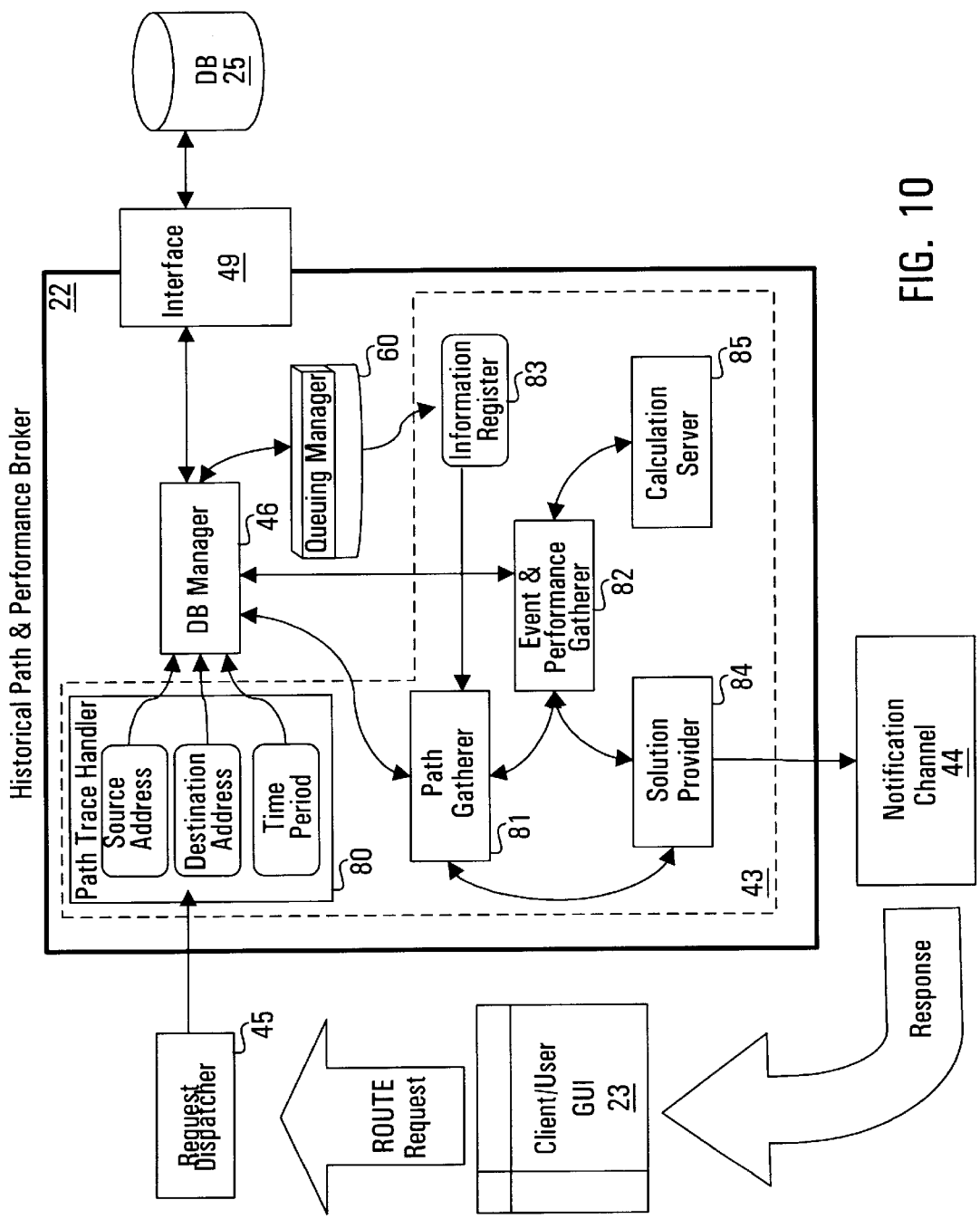
FIG. 10 is a block diagram of the historical path & performance broker as implemented in the management server of the RPM system of FIG. 4.

Referring now to FIG. 10, the historical path & performance broker 43 as implemented in the management server 22 allows the user to retrieve the historical route and performance data respectively collected and permanently stored in the database 25 as a result of carrying out historical route trace requests and historical performance monitoring requests.

The historical path & performance broker 43 is comprised of a path trace handler 80, a path gatherer 81, an information register 83, an event & performance gatherer 82, a solution provider 84 and a calculation server 85 all interconnected within the management server 10 as follows. The path trace handler 80 is externally connected to the request dispatcher 45 and the DB manager 46, Also externally connected to the DB manager 46 is the path gatherer 81 and the event & performance gatherer 82. The path gatherer 81 is also connected to the information register 83, the event & performance gatherer 82 and the solution provider 84 while the event & performance gatherer 82 is also connected to the calculation server 85. Lastly, in addition to being connected to the path gatherer 81, the information register 83 is also externally connected to the queuing manager 60.

As noted above, the historical path & performance broker 43 allows the user to retrieve the historical performance or route data associated with a particular route which has been collected and permanently stormed in the database following the execution of previous historical route trace requests or historical performance monitoring requests. In order to do this, the user initiates a request through the GUI 23 specifying a particular route and the desired time period for which the historical performance data or route data is to be retrieved. The user's request is received in the request dispatcher 45 which places it into the path trace handler 80. The path trace handler 80 operates to extract from the historical retrieval request the specified time period and the source and destination endpoint components defining the route for which historical data is to be retrieved she path trace handler 80 subsequently forwards them to the DE manager 46 which then requests and captures from the database 25 all the paths associated with the specified source and destination endpoint components of the specified route for the desired time period.

Once captured from the database 25, the DB manager 46 places the paths into the queuing manager 60 for processing. The queuing manager 60 will then sequentially send, in accordance with its defined priority levels, the paths queued to the information register 83 for further processing. The path gatherer 81 then reads the paths from the information register 83 and, for each path read, requests the event & performance gatherer 82 to retrieve all associated routing events and performance information from the database 25. The event & performance gatherer 82 together with the solution provider 84 operate to process the data collected from the database 25 into a format suited for use by the GUI 23 through the notification channel 44.

Figure 11:
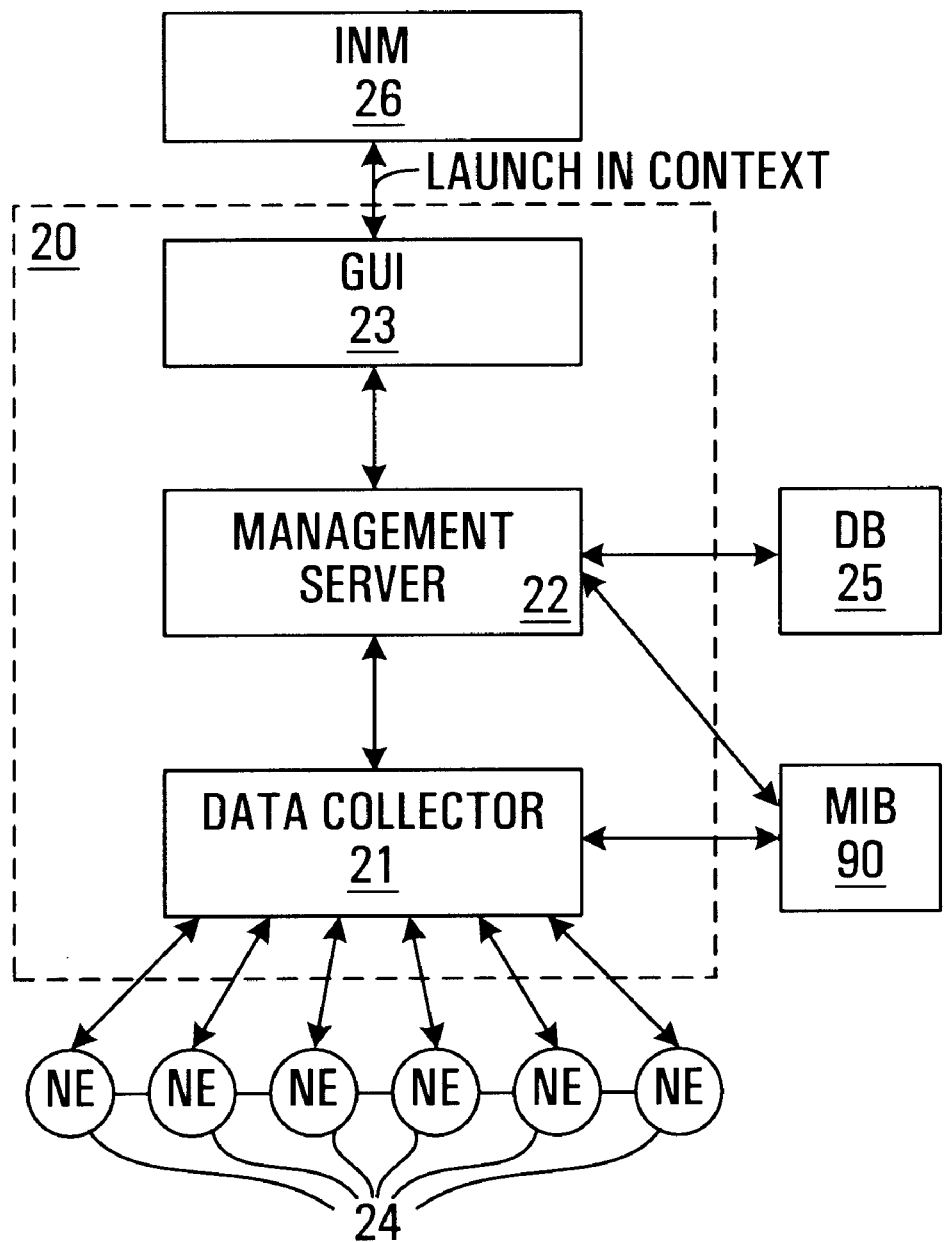
FIG. 11 is a block diagram of a second embodiment of the RPM system of FIG. 2.

Referring now to FIG. 11, there is shown a second embodiment of the RPM system 20 where a MIB 90 is also used to temporarily store the routing and performance information gathered by the management server 22. In order to store this information, the MIB 90 also has defined the network-level concepts of routes and paths as manageable objects. These routes and paths objects can then be accessed by SNMP agents of other network elements 24 of the IP network 10 or any other network entity/application which may benefit from that information. The implementation of MIBs such as the MIB 90 is well known and is not described here in any detail.

The RPM system functionality described above is implemented in the network manager 1 by programming a general purpose computer (not shown). It is understood that the preparation of the programs necessary to accomplish this RPM functionality is obvious to persons of ordinary skilled in the network management art, particularly in view of the detailed description of the functionality of the management server 22 provided above in reference to FIGS. 4 through 9.

While the invention has been described above with reference to a particular type of network, further modifications and improvements to support other types of networks which will occur to those skilled in the art, may be made within the purview of the appended claims, without departing from the scope of the invention in its broader aspect.

In particular, the invention has been described above with respect to an IP network. It is understood that the invention could also be applied to other types of networks. Further, the invention is not restricted to SNMP networks with an INM management platform and could also be used with manager-agent environments different from SNMP and in association with other management platforms.

The RPM system has been described above with reference to a particular GUI design. It is to be understood that other GUI designs may also be used to enable a GUI user to specify and monitor routes, paths and associated interfaces in a network in accordance with the present invention. As an example, the GUI has been described above as having a main computer window which is subdivided into 5 sanctions for entering the RPM monitoring parameters and viewing the corresponding RPM results. It is to be understood that the computer window could be subdivided into more or less than 5 sections according to the GUI user's specific management needs.

It is also to be understood that other types of user interfaces may be used. For example, a command line interface (CLI) could be used. Moreover, the user interface has been described as being separate from the management server. It is to be understood that if necessary, the user interface may also be implemented internally to the management server and still fall within the purview of the present invention.

We claim:

1. A route and path management (RPM) system for a communication network comprising a plurality of network elements whereby the network elements form multiple sets of paths, each set of paths being associated with a respective route in the communication network, the RPM comprising:
   a data collector for collecting data from the plurality of network elements whereby the data collected relates to at least one route and an associated set of paths formed in the communication network;
   a management server connected to the data collector to receive the data collected for monitoring the at least one route and the associated set of paths formed in the communication network; and
   a user interface connected to the management server for specifying the at least one route to monitor and reporting the routing performance and path changes associated therewith;
   wherein for monitoring the at least one route and the associated set of paths defined in the communication network, the management server is comprised of:
      a path trace and logic unit connected to the user interface for receiving the at least one route to monitor and performing historical and real-time monitoring of the path changes of the associated set of paths; and
      a performance monitor logic unit connected to the user interface for receiving the at least one route to monitor and for monitoring the performance of the at least one route and the associated set of paths historically and in real-time; and
   wherein for performing historical and real-time monitoring of path changes of the associated set of paths, the path trace and monitor logic unit is comprised of:
      a trace handler for receiving the at least on route specified from the user interface;
      a path objects assemble for assembling the set of paths associated with the at least on route specified; and
      a path change monitor logic unit for monitoring changes in the set of paths associated with the at least on route specified.

2. A route and path management (RPM) system for a communication network comprising a plurality of network elements whereby the network elements form multiple sets of paths, each set of paths being associated with a respective route in the communication network, the RPM comprising:
   a data collector for collecting data from the plurality of network elements whereby the data collected relates to at least one route and an associated set of paths formed in the communication network;
   a management server connected to the data collector to receive the data collected for monitoring the at least one route and the associated set of paths formed in the communication network; and
   a user interface connected to the management server for specifying the at least one route to monitor and reporting the routing performance and path changes associated therewith;
   wherein for monitoring the at least one route and the associated set of paths defined in the communication network, the management server is comprised of:
      a path trace and monitor logic unit connected to the user interface for receiving the at least one route to monitor and performing historical and real-time monitoring of the path changes of the associated set of paths; and
      a performance monitor logic unit connected to the user interface for receiving the at least one route to monitor and for monitoring the performance of the at least on route and the associated set of paths historically and in real-time; and
   wherein for historically monitoring of the performance of the at least one route and the associated set of paths, the performance monitor logic unit is comprised of:
      a monitoring queue for receiving the at least one route specified from the user interface and holding identification and performance data related to the at least one route specified and the associated set of paths;
      an object performance monitor logic unit connected to the monitoring queue for polling the network elements forming the associated set of paths for new identification and performance data;
      a path performance monitor logic unit connected to both the monitoring queue and the object performance monitor logic unit for computing the performance associated with each path of the set of paths;
      a route performance monitor logic unit connected to both the monitoring queue and the path performance monitor logic unit for computing the overall performance of the at least one route specified; and
      a threshold crossing logic unit connected to the object performance monitor logic unit, the pat performance monitor logic unit and the route performance monitor logic unit for measuring the performance of the at least specified route and the associated set of paths against suitable performance thresholds.

3. A route and path management (RPM) system for a communication network comprising a plurality of network elements whereby the network elements form multiple sets of paths, each set of paths being associated with a respective route in the communication network, the RPM comprising:
  a data collector for collecting data from the plurality of network elements whereby the data collected relates to at least one route and an associated set of paths formed in the communication network;
  a management server connected to the data collector to receive the data collected for monitoring the at least one route and the associated set of paths formed in the communication network; and
  a user interface connected to the management server for specifying the at least on route to monitor and reporting the routing performance and path changes associated therewith;
  wherein for monitoring the at least on route and the associated set of paths defined in the communication network, the management server is comprised of:
    a path trace and logic unit connected to the user interface for receiving the at least one route to monitor and performing historical and real-time monitoring of the path changes of the associated set of paths; and
    a performance monitor logic unit connected to the user interface for receiving the at least on route to monitor and for monitoring the performance of the at least on route and the associated set of paths historically and in real-time; and
  wherein for monitoring the performance of the at least one route and the associated set of paths in real-time, the performance monitor logic unit is further comprised of:
    an object performance logic unit connected to the monitoring queue for polling the network elements forming the associated set of paths for new identification and performance data;
    a path performance logic unit connected to both the monitoring queue and the object performance logic unit for computing the performance associated with each path of the set of paths; and
    a route performance logic unit connected to both the monitoring queue and the path performance logic unit for computing the overall performance of the at least one route specified.

4. A route and path management (RPM) system for a communication network comprising a plurality of network elements whereby the network elements form multiple sets of paths, each set of paths being associated with a respective route in the communication network, the RPM comprising:
  a data collector for collecting data from the plurality of network elements whereby the data collected relates to at least one route and an associated set of paths formed in the communication network
  a management server connected to the data collector to receive the data collected for monitoring the at least one route and the associated set of paths formed in the communication network; and
  a user interface connected to the management server for specifying the at least one route to monitor and reporting the routing performance and path changes associated therewith;
  wherein for monitoring the at least one route and the associated set of paths defined in the communication network, the management server is comprised of;
    a path trace and logic unit connected to the user interface for receiving the at least one route to monitor and performing historical and real-time monitoring of the path changes of the associated set of paths; and
    a performance monitor logic unit connected to the user interface for receiving the at least one route to monitor and for monitoring the performance of the at least on route and the associated set of paths historically and in real-time; and
  wherein the management server further comprises a historical path and performance broker connected to the user interface for historically analysing the routing performance and the path changes of the at least one route and the associated set of paths, the historical path and performance broker comprising:
    a trace handler for receiving the at least one route specified from the user interface;
    a path gatherer for retrieving the set of paths associated with the at least one route specified;
    an event and performance gatherer for gathering the routing performance data and the path changes of the at least one route and the associated set of paths, and
    a solution provider for processing the routing performance data and the path changes of the at least one route and the associated set of paths in a form appropriate for analysis.

5. The RPM system of claim 1 wherein the data collector is operable with simple network management protocol (SNMP).

6. The RPM system of claim 1 wherein the data collector is comprised of a trap gatherer for gathering the generated by network elements of the communication network.

7. The RPM system of claim 6 wherein the management server further has a trap handler connected to the trap gatherer for handling the traps generated and notifying the user interface of significant events.

8. The RPM system of claim 1 wherein the RPM system is operable with integrated network management (INM).

9. The RPM system of claim 1 in combination with a database for storing the routing performance results of the at least one route and the path changes associated therewith.

10. The RPM system of claim 9 in combination with a management information base (MIB) for providing SNMP access to the at least one route and the associated set of paths monitored.

11. A method for managing routes and paths in a communication network comprising a plurality of network elements whereby the network elements form multiple sets of paths, each set of paths comprising at least one forward path and one backward path and being associated with a respective route defined by a source endpoint and a destination endpoint in the communication network, the method comprising the steps of:
  collecting data from the plurality of network elements whereby the data collected relates to at least one route and an associated set of paths; and
  monitoring the at least one route and the associated set of paths;
  wherein the step of monitoring the at least one route and the associated set of paths comprises the steps of:
    performing historical and real-time monitoring of the path changes of the associated set of paths; and
    monitoring of the performance of the at least one route and the associated set of paths historically and in real-time; and
  wherein the step of performing historical and real-time monitoring of the path changes of the associated set of paths comprises the steps of:
    assembling each one of the set of paths; and
    monitoring the path changes of the associated set of paths historically and in real-time.

12. The method of claim 1 wherein the step of assembling each one of the set of paths comprises the steps of:
- at each of the source endpoint and subsequent intermediate points located between the source endpoint and the destination endpoint, collecting routing information for assembling the at least one forward path of the set of paths; and
- at each of the destination endpoint and subsequent intermediate points located between the destination endpoint and the source endpoint, collecting routing information for assembling the at least one backward path of the set of paths.

* * * * *

UNITED STATES PATENT AND TRADEMARK OFFICE
CERTIFICATE OF CORRECTION

PATENT NO. : 6,570,867 B1
DATED : May 27, 2003
INVENTOR(S) : Mark C. Robinson et al.

It is certified that error appears in the above-identified patent and that said Letters Patent is hereby corrected as shown below:

Column 15,
Line 66, "on" should be -- one --

Column 16,
Line 1, "assemble" should be -- assembler --
Lines 2, 6 and 34, "on" should be -- one --
Line 60, "pat" should be -- path --
Line 63, "specified route" should be -- one route specified --

Column 17,
Lines 13, 16, 24 and 25, "on" should be -- one --

Column 18,
Line 4, "on" should be -- one --
Line 27, "the" should be -- traps --

Signed and Sealed this

Seventh Day of October, 2003

JAMES E. ROGAN
*Director of the United States Patent and Trademark Office*